(12) United States Patent
Eystein

(10) Patent No.: US 7,021,865 B2
(45) Date of Patent: Apr. 4, 2006

(54) APPARATUS AND METHOD FOR USE IN LAYING OR RECOVERING OFFSHORE PIPELINES OR CABLES

(75) Inventor: Borgen Eystein, Hundvaag (NO)

(73) Assignee: Rockwater Limited, Leatherhead (GB)

( * ) Notice: Subject to any disclaimer, the term of this patent is extended or adjusted under 35 U.S.C. 154(b) by 0 days.

(21) Appl. No.: 10/492,826

(22) PCT Filed: Oct. 15, 2002

(86) PCT No.: PCT/EP02/11525

§ 371 (c)(1),
(2), (4) Date: Oct. 12, 2004

(87) PCT Pub. No.: WO03/033953

PCT Pub. Date: Apr. 24, 2003

(65) Prior Publication Data

US 2005/0036841 A1    Feb. 17, 2005

(30) Foreign Application Priority Data

Oct. 16, 2001   (NO) .................................. 0124853

(51) Int. Cl.
*F16L 1/00*   (2006.01)
*F16L 1/12*   (2006.01)

(52) U.S. Cl. .................. 405/168.1; 405/166; 405/167; 405/168.2; 405/168.4; 405/184.4

(58) Field of Classification Search ............. 405/154.1, 405/158, 166, 167, 168.1–168.4, 173, 184.4
See application file for complete search history.

(56) References Cited

U.S. PATENT DOCUMENTS

| | | | |
|---|---|---|---|
| 3,517,519 A | * | 6/1970 | Kolb et al. ................. 405/167 |
| 3,589,136 A | * | 6/1971 | Sorenson et al. ........... 405/166 |
| 3,736,760 A | | 6/1973 | Carstens |
| 3,822,559 A | | 7/1974 | Matthews et al. |
| 3,911,689 A | * | 10/1975 | Hogan ...................... 405/168.1 |
| 3,994,140 A | | 11/1976 | Gunderson |

(Continued)

FOREIGN PATENT DOCUMENTS

EP         489210      *    6/1992

(Continued)

OTHER PUBLICATIONS

European Patent Office, "International Search Report," International Appl. No. PCT/EP02.11525, Jan. 24, 2003, 2 pages.

(Continued)

*Primary Examiner*—Jong-Suk (James) Lee
(74) *Attorney, Agent, or Firm*—Haynes and Boone, LLP

(57) ABSTRACT

During recovery of an offshore pipeline, to a floating vessel for repair, for example, the pipeline is secured to a hang-off clamp. Due to the motion of the vessel, oscillating bending moments can be caused in the pipeline below the clamp. To reduce these bending moments an auxiliary member is employed which restricts "radial" movement of the pipeline below the clamp. The auxiliary member comprises an elongate element, such as a pipe, whose upper end is fixed to the vessel and whose lower end carries a member connecting it to the pipeline. Axial movement of the pipeline with respect to the connecting member is permitted. The auxiliary member is designed to have predetermined amount of flexibility, this being provided in particular by flexibility of the pipe, and it thus restricts the amount of radial movement of the pipeline which is permitted below the clamp.

9 Claims, 1 Drawing Sheet

U.S. PATENT DOCUMENTS

| | | | | |
|---|---|---|---|---|
| 4,112,698 A | * | 9/1978 | Lammert et al. | 405/167 |
| 4,433,938 A | | 2/1984 | Boon | |
| 4,472,079 A | | 9/1984 | Langner | |
| 4,906,137 A | * | 3/1990 | Maloberti et al. | 405/224.3 |
| 6,776,560 B1 | * | 8/2004 | Moszkowski et al. | 405/166 |
| 6,857,822 B1 | * | 2/2005 | Hooper et al. | 405/224.4 |

FOREIGN PATENT DOCUMENTS

| | | |
|---|---|---|
| GB | 1154199 | 9/1967 |
| GB | 2288002 | 10/1995 |
| GB | 2354889 A | 4/2001 |

OTHER PUBLICATIONS

European Patent Office, International Searching Authority, "International Search Report", International Appl. No. PCT/EP02/11525, Jan. 17, 2003, 3 pages.

Great Britian—The Patent Office "Search Report Under Section 17," GB International Appl. No. GB 0124853.3, Mar. 20, 2002, 1 page.

* cited by examiner

APPARATUS AND METHOD FOR USE IN LAYING OR RECOVERING OFFSHORE PIPELINES OR CABLES

CROSS REFERENCE

This application is a national phase filing of international application No. PCT/EP02/11525, filed Oct. 15, 2002, which claims priority to Great Britain patent application No. 0124853.3, filed Oct. 16, 2001.

FIELD OF THE INVENTION

This invention relates to an apparatus and method for use in laying or recovering offshore pipelines or cables, and in particular to means and methods for reducing the bending moments in offshore pipelines or cables.

BACKGROUND OF THE INVENTION

When a pipeline is rigidly connected to a floating vessel laying or recovering it in deep water, high bending moments occur at the connection. Due to the motion of the vessel these bending moments will oscillate and this introduces high degrees of stress and potential fatigue and failure of the pipeline.

The occurrence of these high bending moments and their resultant effects on the pipeline are particularly disadvantageous in connection with the recovery of pipelines for repair purposes. Currently the repair of pipelines involves the recovery of the pipeline and then using a hang-off clamp, which rigidly fixes (connects) the pipeline to the vessel. A repair can then be made to the pipeline "above" the hang-off clamp. This pipeline hang-off occurs generally through a moonpool at the side or over the stern of the vessel. The pipeline bending moments are concentrated in the area immediately below the hang-off clamp. The high bending moment in this area, with the resultant fatigue problems, causes a great limitation in the allowable operational seastate for such a hang-off and repair operation, or indeed any operation where such a hang-off is involved, for both pipelines and cables. This is particularly the case when a monohull vessel is used. For the conventional methods of hang-off and pipeline repair, a vessel spends a considerable amount of non-operational time "waiting for the weather".

It is thus highly desirable to provide a means and method of reducing the bending moments of a pipeline or cable when rigidly hung off a vessel.

SUMMARY OF THE INVENTION

According to one aspect of the present invention there is provided apparatus for restricting bending moments occurring in an elongate member secured to a hang-off connection point on a floating vessel as part of an underwater laying or recovery operation, the bending moments arising below said connection point, the apparatus comprising an auxiliary elongate member one end of which is in use secured to the vessel and the other end of which is in use connected to the elongate member at a position below the connection point, and wherein the auxiliary elongate member is flexible to such an extent as to permit up to a predetermined amount of radial movement of the elongate member, and corresponding restriction of the bending moments, in use thereof.

According to another aspect of the present invention there is provided a system for restricting bending moments occurring in an elongate member secured to a floating vessel as part of an underwater laying or recovery operation, comprising clamping means for securing the elongate member to the vessel in a hang-off position, the bending moments arising below said clamping means, an auxiliary elongate member one end of which is secured to the vessel in use and the other end of which is for connection to the elongate member at a position below said clamping means, and wherein the auxiliary elongate member is flexible to such an extent as to permit up to a predetermined amount of radial movement of the elongate member and a corresponding restriction to the bending moments.

According to yet another aspect of the present invention there is provided a method for restricting bending moments occurring in an elongate member secured to a hang-off connection point on a floating vessel as part of an underwater laying or recovery operation, the bending moments arising below said connection point, including the steps of connecting one end of a flexible elongate supporting member to the elongate member at a position below the connection point, and connecting the other end of the supporting member to the vessel at such a position that radial movement of the elongate member is restricted, the supporting member being flexible to such an extent as to permit up to a predetermined amount of radial movement of the elongate member.

When the apparatus is for use with an elongate element comprising an offshore pipeline, the other end of the auxiliary elongate member may be a clamp through which the pipeline is axially movable but which serves to position the pipeline radially.

The clamp at the other end of the auxiliary elongate element can include rollers to facilitate laying of a pipeline.

Preferably, the auxiliary elongate member is a pipe whose structural properties are selected whereby to provide a predetermined amount of flexibility.

The auxiliary elongate member may be a flexible pipe and there may be local flexibility at the connection between the clamp and the other end of the pipe. The overall flexibility of the apparatus then comprises a combination of the flexibility of the pipe and the local flexibility.

Means may be provided for retracting the auxiliary elongate member and permitting its disposal in a non-use position on the vessel.

BRIEF DESCRIPTION OF THE DRAWINGS

Embodiments of the invention will now be described with respect to the accompanying drawings, in which.

DETAILED DESCRIPTION

Figure 1:
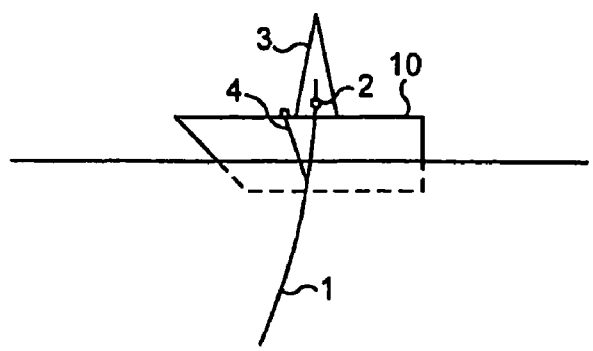
FIG. 1 illustrates, highly schematically, a pipeline hung off a structure secured to a vessel and apparatus for restricting the bending moment of the pipeline.

In the drawings a pipeline 1 is hung off the side of a floating vessel 10 by means of a hang-off clamp 2 secured, for example, to a derrick 3 on the vessel by means not shown. The bending moments are concentrated in the area immediately below the clamp 2, and depending on the seastate can be considerable.

Figure 2:
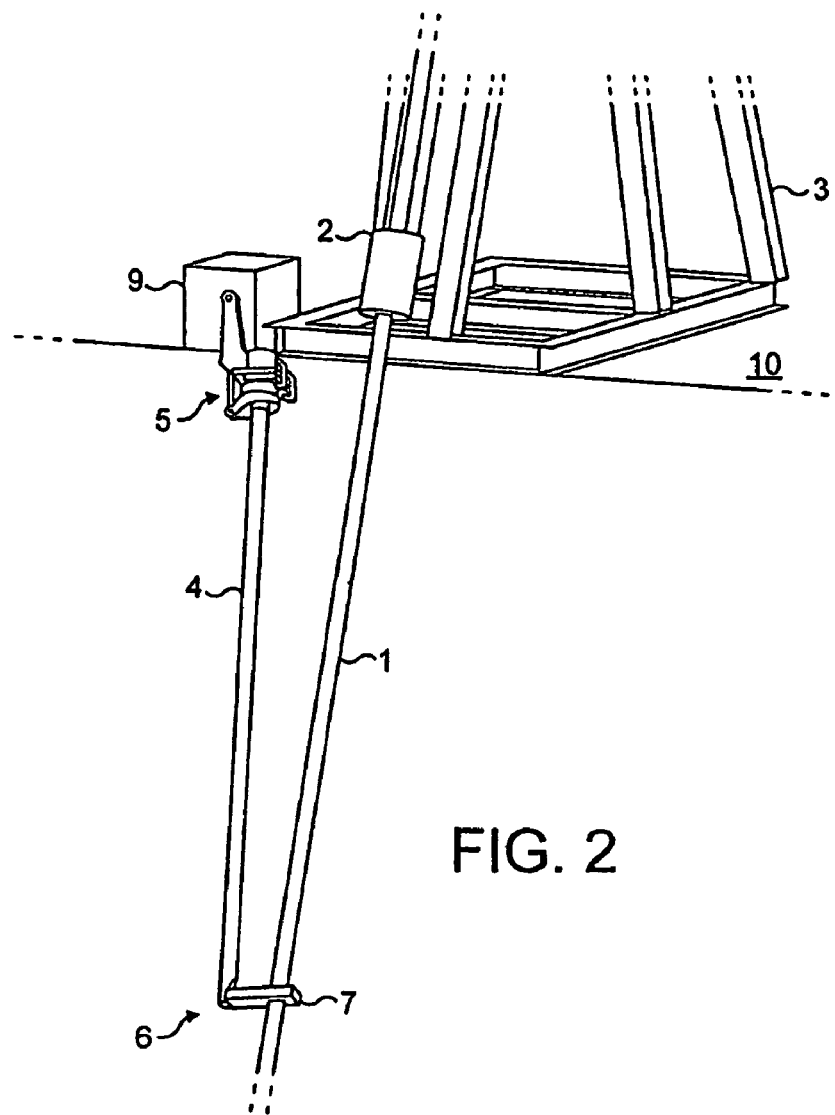
FIG. 2 illustrates elements of the bending moment restriction apparatus in greater detail.

Referring now particularly to FIG. 2, in order to reduce the bending moments, or rather restrict them, an auxiliary member or elongate supporting member is provided. This basically comprises a pipe 4 rigidly connected in use to a mounting 9 therefor of the vessel at its uppermost end 5, and connected to the pipeline 1 at its lower end 6, by a respective clamp 7 which engages pipeline 1 in such a manner as to permit axial movement of pipeline 1 through it, but in such a manner as to position the pipeline radially, that is to restrict radial movement of the pipeline 1 and thus to reduce the bending moments. The pipe 4 is flexible and so the radial position of the clamp 7 and thus of the pipeline 1 is variable, but restricted within predetermined limits.

The amount of flexibility is adjustable as required by selecting the structural properties of the pipe 4, such as diameter and wall thickness, in order to provide pipe 4 with a predetermined amount of flexibility. Alternatively and/or additionally the required flexibility can be obtained by including local flexibility at the connection (clamp 7) between the pipe 4 and the pipeline 1, namely at the clamp 7. For maximum effectiveness of the bending moment restriction system, there is an optimum length for the pipe 4, and this will depend on the properties of the pipeline 1 itself.

As indicated schematically in FIG. 2, means can be provided whereby the flexible support pipe 4, which acts as a bend stiffener, although rigidly secured to the vessel at uppermost end 5 in use, can be hinged (or pivoted) and/or retracted to deck-level during non-use and vessel transit. Indeed, the support (bending moment restrictor) can be disposed at an "out of the way" position while the pipeline is being pulled up to the vessel, and then deployed into an "operational" position and installed in a matter of a few minutes. Conversely, the support can be quickly removed when the pipeline is to be relowered to the seabed.

As will be appreciated from the above, the bending moments are shared between the hang-off clamp 2 and the clamp 7 at the end of pipe 4. This leads to the maximum bending moments in the pipeline being reduced by approximately 40–50%, and the operational seastate can as a result be increased by up to 80–100%.

For any specific project, the structural properties of the overall bend stiffener can be optimized, both with respect to required flexibility, the length, diameter, wall thickness of the pipeline 1, as well as with respect to fatigue and necessary strength of the bend restrictor itself.

Typically for a pipeline of 12 inches (30.48 cm) diameter with a wall thickness of 14.8 mm, an 11 m long bend restrictor of 12 inches (30.48 cm) with a wall thickness of 25 mm would be required. By increasing the bend stiffness (and strength) of the bend stiffener pipe 4 and fine tuning the desired total flexibility by means of flexibility in the clamp 7, the fatigue usage of the bend stiffener pipe 4 can be reduced. In this manner the same pipe 4 can be used for a whole range of pipeline 1 sizes.

Whilst the invention has been described with reference to pipeline recovery and repair, the bend restrictor may also be used in the manner of a stinger and indeed it may be referred to as a stinger, particularly a flexible stinger, and be used during pipeline laying, in which case it would be equipped with rollers at the "clamp" 7. This would be particularly beneficial during long stops in a lay which would otherwise normally cause pipeline fatigue problems. Additionally such a stinger could be used to improve conventional J-lay systems.

The invention thus provides means for restricting bending moments for a pipeline when the latter is rigidly hung off a floating vessel, either during lifting for repair or laying, which is quickly installable and removable and does not necessitate large structures to be welded to the vessel. Whilst the invention has been particularly described with respect to use with offshore pipelines it is equally applicable to use with submarine cables and similar elongate members which may be required to be laid and/or recovered, with or without repair, in an offshore or similar deep water environment. Whilst the invention has been described with respect to the pipe 4 being rigidly connected to the vessel, there alternatively may be a degree of flexibility at this connection.

The invention claimed is:

1. An apparatus for restricting bending moments occurring in an offshore pipeline secured to a hang-off connection point on a floating vessel as part of an underwater laying or recovery operation, the bending moments arising below said connection point, the apparatus comprising an auxiliary elongate member one end of which is in use secured to the vessel and the other end of which is in use connected to the pipeline at a position below the connection point, wherein the auxiliary elongate member is flexible to such an extent as to permit up to a predetermined amount of radial movement of the pipeline, and corresponding restriction of the bending moments, in use thereof, wherein at the other end of the auxiliary elongate member is a clamp through which the pipeline is axially movable but which serves to position the pipeline radially, wherein the auxiliary elongate member is a pipe whose structural properties are selected to provide a predetermined amount of flexibility, and wherein the apparatus for restricting bending moments engages the pipeline only with the clamp.

2. The apparatus as claimed in claim 1, wherein the clamp at the other end of the auxiliary elongate member includes rollers to facilitate laying of said pipeline.

3. The apparatus as claimed in claim 1, wherein the auxiliary elongate member is a flexible pipe, and wherein there is a local flexibility at the connection between the clamp and the other end of the auxiliary elongate member, the overall flexibility of the apparatus comprising a combination of the flexibility of the pipe and the local flexibility.

4. The apparatus as claimed in claim 1 and including means for retracting the auxiliary elongate member and permitting its disposal in a non-use position.

5. A system for restricting bending moments occurring in an offshore pipeline secured to a floating vessel as part of an underwater laying or recovery operation, comprising clamping means for securing the pipeline to the vessel in a hang-off position, the bending moments arising below said clamping means, an auxiliary elongate member one end of which is secured to the vessel in use and the other end of which is for connection to the pipeline at a position below said clamping means, and wherein the auxiliary elongate member is flexible to such an extent as to permit up to a predetermined amount of radial movement of the pipeline and a corresponding restriction to the bending moments, wherein the other end of the auxiliary elongate member includes a clamp through which the pipeline is axially movable but which serves to position the pipeline radially, and wherein the auxiliary elongate member is a pipe whose structural properties are selected to provide a predetermined amount of flexibility, and wherein the system for restricting bending moments engages the pipeline only with the clamp.

6. The system as claimed in claim 5 and wherein the clamp at the other end of the auxiliary elongate member includes rollers to facilitate laying of the pipeline.

7. The system as claimed in claim 5 wherein the auxiliary elongate member is a flexible pipe, and wherein there is local flexibility at the connection between the clamp and the other end of the auxiliary elongate member, the overall flexibility of the apparatus comprising a combination of the flexibility of the pipe and the local flexibility.

8. The system as claimed in claim 5 and including means for retracting the auxiliary elongate member and permitting its disposal in a non-use position on the vessel.

9. A method for restricting bending moments occurring in an offshore pipeline secured to a hang-off connection point on a floating vessel as part of an underwater laying or recovery operation, the bending moments arising below said connection point, including the steps of:

connecting one end of a flexible elongate supporting member to the pipeline at a position below the connection point, connecting the other end of the supporting member to the vessel at such a position that radial movement of the pipeline is restricted, the supporting member being flexible to such an extent as to permit up to a predetermined amount of radial movement of the pipeline, the other end of the auxiliary elongate member comprising a clamp through which the pipeline is axially movable but which serves to position the pipeline radially, and the auxiliary elongate member being a pipe whose structural properties are selected to provide a predetermined amount of flexibility, and contacting the pipeline on one side of the connection point only with the clamp.

* * * * *